United States Patent
Lorenzo et al.

(10) Patent No.: US 12,063,418 B2
(45) Date of Patent: Aug. 13, 2024

(54) DETECTION AND REDIRECTION OF VIDEO PLAYBACK

(71) Applicant: Comcast Cable Communications, LLC, Philadelphia, PA (US)

(72) Inventors: Christopher Lorenzo, Philadelphia, PA (US); John Riviello, Voorhees, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 368 days.

(21) Appl. No.: 16/248,381

(22) Filed: Jan. 15, 2019

(65) Prior Publication Data

US 2020/0228879 A1    Jul. 16, 2020

(51) Int. Cl.
| | | |
|---|---|---|
| H04N 21/472 | (2011.01) | |
| H04N 21/414 | (2011.01) | |
| H04N 21/436 | (2011.01) | |
| H04N 21/437 | (2011.01) | |
| H04N 21/643 | (2011.01) | |
| H04N 21/647 | (2011.01) | |
| H04N 21/654 | (2011.01) | |
| H04N 21/858 | (2011.01) | |

(52) U.S. Cl.
CPC . *H04N 21/47217* (2013.01); *H04N 21/41407* (2013.01); *H04N 21/436* (2013.01); *H04N 21/437* (2013.01); *H04N 21/64322* (2013.01); *H04N 21/64738* (2013.01); *H04N 21/654* (2013.01); *H04N 21/8586* (2013.01)

(58) Field of Classification Search
CPC ....... H04N 21/47217; H04N 21/41407; H04N 21/436; H04N 21/437; H04N 21/64322; H04N 21/64738; H04N 21/654; H04N 21/8586
See application file for complete search history.

(56) References Cited

U.S. PATENT DOCUMENTS

| | | | |
|---|---|---|---|
| 10,686,856 B1 * | 6/2020 | Straitiff | H04N 21/4227 |
| 2011/0181780 A1 * | 7/2011 | Barton | H04N 21/812 |
| | | | 348/563 |
| 2012/0054808 A1 * | 3/2012 | Nijim | H04N 21/47202 |
| | | | 725/133 |
| 2014/0013342 A1 * | 1/2014 | Swan | H04N 21/47217 |
| | | | 725/5 |
| 2014/0373040 A1 * | 12/2014 | Lin | H04N 21/4126 |
| | | | 725/25 |

* cited by examiner

Primary Examiner — Nicholas T Corbo
(74) Attorney, Agent, or Firm — BakerHostetler (57) ABSTRACT

Methods, systems, and apparatuses for detecting, analyzing, and redirecting data are described herein. A wireless gateway may detect data associated with at least one characteristic that is being received by a first computing device via a first network. The wireless gateway may send, to the first computing device, a message comprising a selectable option to render the received data on a display device associated with a second computing device. If the option was selected, the wireless gateway may send, to a server via a second network, a request message comprising a request for information associated with the received data. The wireless gateway may receive, from the server via the second network, the requested information and then send, to the second computing device in response to receiving the requested information, the received data to be rendered by the display device.

20 Claims, 4 Drawing Sheets

DETECTION AND REDIRECTION OF VIDEO PLAYBACK

TECHNICAL FIELD

The present invention relates to methods, systems, and apparatuses for redirecting data being received by computing devices such as tablets, laptops, and smartphones.

BACKGROUND

Use of services such as those provided by video service providers that are accessible via the Internet on mobile devices such as smartphones, tablets, and laptops is increasingly common. Users often access these services using the wireless local area network (WLAN) in their home in order to play back movies and television programming. These services may also be accessible on their television via the set-top box provided by their cable service or any other device connected to their television and having network access. Methods for switching from one device to another without losing progress are lacking.

Accordingly, there is a need for a method and apparatus for redirecting videos being watched on a mobile device to a television without having to lose the progress of playback of the video or manually restart the video.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure Methods, systems, and apparatuses for detecting, analyzing, and redirecting data are described herein. A method for redirecting data is described herein in accordance with one embodiment. The method may comprise detecting data associated with at least one characteristic that is being received by a first computing device via a first network. The method may comprise sending, to the first computing device, a message comprising a selectable option to render the received data on a display device associated with a second computing device instead of the first computing device. The method may comprise receiving, from the first computing device, a response message indicating whether the option was selected. If the option was selected, the method may comprise sending, to a server via a second network, a request message comprising a request for information associated with the received data. The method may comprise receiving, from the server via the second network, the requested information. The method may comprise sending, to the second computing device in response to receiving the requested information, the received data to be rendered by the display device.

In accordance with another embodiment, a computing device configured for redirecting data may comprise a receiver configured to detect data associated with at least one characteristic that is being received by a second computing device via a first network. The computing device may comprise a transmitter configured to send, to the second computing device, a message comprising a selectable option to render the received data on a display device associated with a third computing device instead of the second computing device. The computing device may comprise the receiver further configured to receive, from the second computing device, a response message indicating whether the option was selected. If the option was selected, the computing device may comprise the transmitter further configured to send, to a server via a second network, a request message comprising a request for information associated with the received data. The computing device may comprise the receiver further configured to receive, from the server via the second network, the requested information. The computing device may comprise the transmitter further configured to send, to the third computing device in response to receiving the requested information, the received data to be rendered by the display device.

In accordance with another embodiment, a system may be configured for redirecting data. The system may comprise a receiver configured to detect data associated with at least one characteristic that is being received by a first computing device via a first network. The system may comprise a transmitter configured to send, to the first computing device, a message comprising a selectable option to render the received data on a display device associated with a second computing device instead of the first computing device. The system may comprise the receiver further configured to receive, from the first computing device, a response message indicating whether the option was selected. If the option was selected, the system may comprise the transmitter further configured to send, to a server via a second network, a request message comprising a request for information associated with the received data. The system may comprise the receiver further configured to receive, from the server via the second network, the requested information. The system may comprise the transmitter further configured to send, to the second computing device in response to receiving the requested information, the received data to be rendered by the display device.

A non-transitory computer-readable storage medium storing computer-readable instructions that, when executed by a processor of a computing device, cause the computing device to perform operations comprising method for redirecting data is described herein in accordance with yet another embodiment. The method may comprise detecting data associated with at least one characteristic that is being received by a first computing device via a first network. The method may comprise sending, to the first computing device, a message comprising a selectable option to render the received data on a display device associated with a second computing device instead of the first computing device. The method may comprise receiving, from the first computing device, a response message indicating whether the option was selected. If the option was selected, the method may comprise sending, to a server via a second network, a request message comprising a request for information associated with the received data. The method may comprise receiving, from the server via the second network, the requested information. The method may comprise sending, to the second computing device in response to receiving the requested information, the received data to be rendered by the display device.

Other features of the methods, systems, and apparatuses are described below. The features, functions, and advantages can be achieved independently in various examples or may be combined in yet other examples, further details of which can be seen with reference to the following description and drawings.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION OF ILLUSTRATIVE EMBODIMENTS

Methods, systems, and apparatuses for redirecting data being received by computing devices such as tablets, laptops, and smartphones are described herein. In the embodiments described herein, videos being watched on a mobile device may be redirected to a television without having to lose the progress of playback of the video or manually restart the video.

Figure 1:
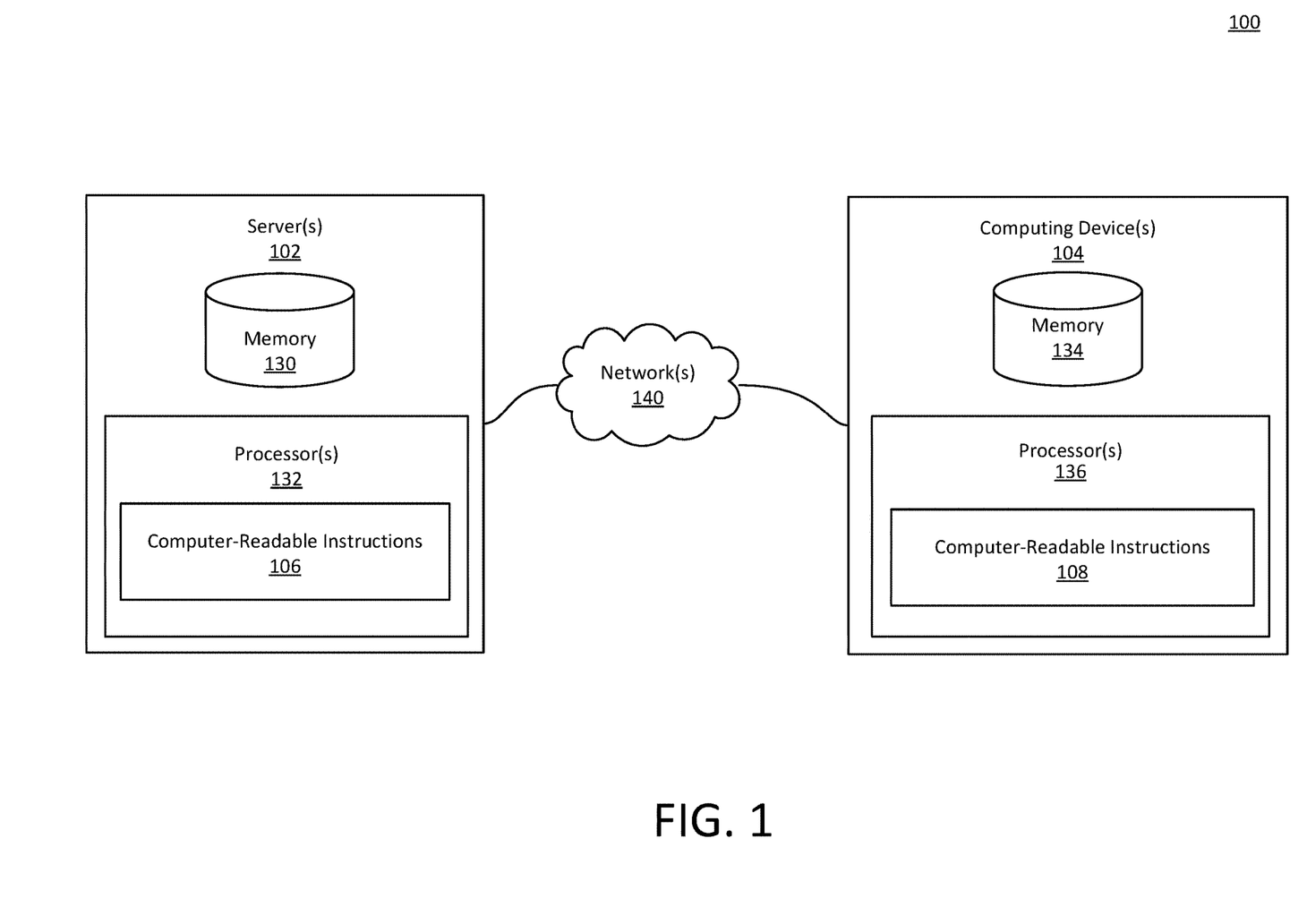
FIG. 1 illustrates a diagram of an example high-level system configured for redirecting received data in accordance with one or more embodiments described herein.

FIG. 1 illustrates a diagram of an example high-level system 100 configured for redirecting received data in accordance with one or more embodiments described herein. In the example of FIG. 1, the system 100 may comprise one or more computing device(s) 104. The computing device(s) 104 may be configured to communicate with one or more server(s) 102. The computing device(s) 104 may be configured to communicate with other computing devices via the server(s) 102 and/or according to a peer-to-peer architecture and/or other architectures. Users may access system 100 via the computing device(s) 104.

The server(s) 102 and/or the computing device(s) 104 may comprise transmitters, receivers, and/or transceivers enabling the server(s) 102, and/or the computing device(s) 104 to be operatively linked to send and receive data via one or more electronic communication links. For example, such electronic communication links may be established, at least in part, via a network 140 such as the Internet and/or other networks. The electronic communication links may enable wired or wireless communications among the server(s) 102 and/or the computing device(s) 104 using technologies such as coaxial cable, Ethernet, fiber optics, microwave, satellite, Public Switched Telephone Network (PTSN), DSL (Digital Subscriber Line), Broadband over Power Lines (BPL), wireless local area network (WLAN) technology such as Institute of Electrical and Electronics Engineers (IEEE) 802.11 technology, wireless cellular technology, Bluetooth, or any other appropriate technologies. It will be appreciated that the example system 100 of FIG. 1 is not intended to be limiting, and that the scope of this disclosure includes implementations in which server(s) 102 and/or computing device(s) 104 may be operatively linked via some other communication media.

The server(s) 102 may be configured by computer-readable instructions 106. The computer-readable instructions may comprise one or more instruction modules. The instruction modules may comprise computer program modules. Processor(s) 132 may be configured to execute the computer-readable instructions 106 and perform the procedures in accordance with the embodiments described herein. By way of non-limiting example, the server 102 may comprise any system that is programmed to send or access content consistent with the description herein, and may comprise, for example, a video/audio server, a content delivery network (CDN), a cable head end, or any other suitable system or other computing platform. The server(s) 102 may comprise a memory 130, and one or more processors 132, and/or other components. The server(s) 102 may comprise communication interfaces, lines, or ports to enable the exchange of information with network 140 and/or other computing platforms. The illustration of the server(s) 102 in FIG. 1 is not intended to be limiting. The server(s) 102 may comprise a plurality of hardware, software, and/or firmware components operating together to provide the functionality attributed herein to server(s) 102. For example, the server(s) 102 may be implemented by a cloud of computing platforms operating together as server(s) 102. The memory 130 may comprise non-transitory storage media that electronically stores information, such as, for example, the computer-readable instructions 106. The processor(s) 132 may be configured to provide information processing capabilities in the server(s) 102.

Computing device(s) 104 in accordance with the various embodiments described herein may comprise a memory 134, and one or more processors 136, and/or other components. The computing device(s) 104 may be configured by computer-readable instructions 108. The computer-readable instructions 108 may comprise one or more instruction modules. The instruction modules may comprise computer program modules. The instruction modules may comprise code that calls application programming interfaces (APIs) associated with a plurality of other applications and computing platforms. The processor(s) 136 may be configured to execute the computer-readable instructions 108, respectively and perform the procedures in accordance with the embodiments described herein. By way of non-limiting example, the computing device 104 may comprise one or more of a set-top box, a wireless gateway, a streaming device, a desktop computer, a laptop computer, a handheld computer, a tablet computing platform, a netbook, a smartphone, a gaming console, and/or other computing platforms. The computing device(s) 104 may comprise communication interfaces, lines, or ports to enable the exchange of information with network 140 and/or other computing platforms. The illustration of the computing device(s) 104 in FIG. 1 is not intended to be limiting. The computing device(s) 104 may comprise a plurality of hardware, software, and/or firmware components operating together to provide the functionality attributed herein to the computing device(s) 104. For example, the computing device(s) 104 may be implemented by a cloud of computing platforms operating together as computing device(s) 104. The memory 134 may comprise non-transitory storage media that electronically stores information, such as, for example, the computer-readable instructions 108. The memory 134 may comprise a plurality of memory blocks of an LSTM network. The processor(s) 136 may be configured to provide information processing capabilities in the computing device(s) 104.

In the example system of FIG. 1, a first computing device 104 may be configured to detect that data traffic associated with at least one characteristic is being received via a network 140 at a second computing device. For example, the first computing device 104 may comprise a wireless gateway that operates as a WLAN router and cable modem, which is capable of detecting data traffic being sent and received by a plurality of computing devices on the WLAN (e.g., a WiFi network accessed by a plurality of computing devices). The second computing device 104 may comprise a smartphone or tablet. The first computing device 104 (i.e. the wireless gateway in this example) may detect at least one characteristic of the received data such as high bandwidth consumption or a uniform resource locator (URL) associated with a video service provider. These detected characteristics of the received data may indicate that the user of the second computing device 104 is watching a video provided by a video service provider. The computing device 104 (i.e. the wireless gateway in this example) may then contact the video service provider in order to receive more information associated with the video being viewed by the user of the second computing device 104 in order to then redirect the video data to a third computing device 104.

Figure 2:
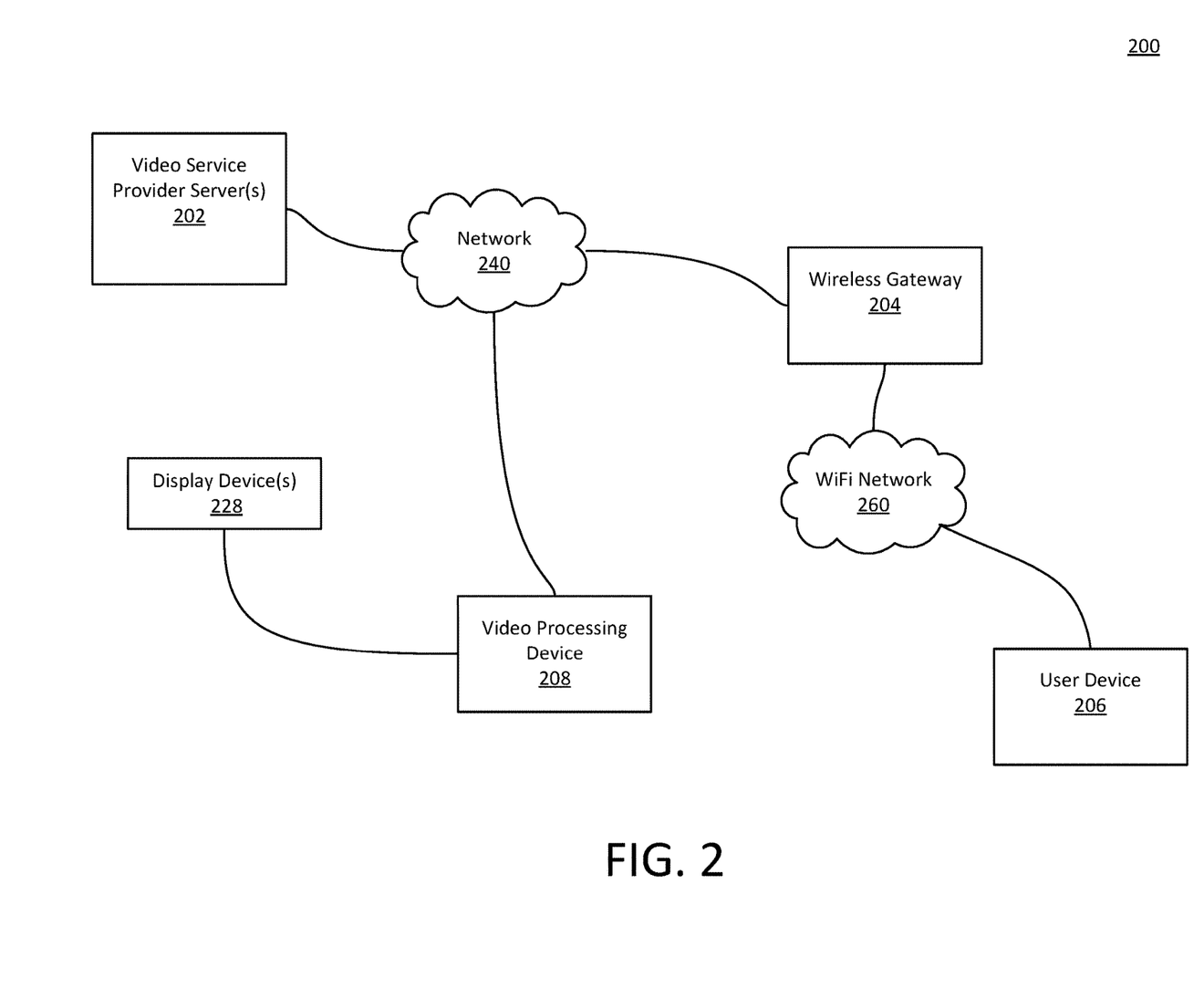
FIG. 2 is a diagram of an example system configured for redirecting received data, in accordance with one embodiment.

FIG. 2 is a diagram of an example system 200 configured for redirecting received data, in accordance with one embodiment, which may be used in combination with any of the embodiments described herein. In the example system of FIG. 2, a wireless gateway 204 may operate as a WLAN router and cable modem. A user device 206 may comprise, for example, a smartphone, tablet, laptop, or other computing device operating on the WiFi network 260. The wireless gateway 204 may detect data associated with at least one characteristic that is being received by the user device 206 via the WiFi network 260. The at least one characteristic of the data may comprise, for example, high bandwidth consumption or a uniform resource locator (URL) identifying a video service provider. For example, the wireless gateway 204 may detect that traffic is being received from a particular video service provider. The at least one characteristic may enable the wireless gateway 204 to identify the source of the data. Alternatively or additionally, the wireless gateway 204 may be configured to receive, from the user device 206 via the WiFi network 260, a message indicating that data associated with the at least one characteristic is being received via the WiFi network 260 at the user device 206.

The wireless gateway 204 may be configured to send, to the user device 206, a message comprising a selectable option to render the data on a display device 228 associated with the video processing device 208 instead of the user device 206. The video processing device 208 may comprise one or more of a set-top box, a streaming device, a desktop computer, a laptop computer, a handheld computer, a tablet computing platform, a netbook, a smartphone, a gaming console, and/or other video processing devices. For example, the video processing device 208 may comprise a set-top box, the display device 228 may comprise a television, and the data may comprise a video. In another example, the video processing device 208 may be associated with a sound system, and the data may comprise audio. In another example, the display device 228 may comprise a television or monitor, and the received data may comprise a plurality of digital photograph files. The selectable option sent from the wireless gateway 204 may, for example, ask a user whether they would like to watch the video on the display device 228 (e.g., their television) rather than the user device 206 (e.g., their tablet).

The wireless gateway 204 may be configured to receive, from the user device 206, a response message indicating whether the option was selected. If the option was selected, the wireless gateway 204 may send, to a video service provider server 202 via a network 240, a request message comprising a request for information associated with the data. The request message may further comprise an internet protocol (IP) address associated with a user of the video service provider, and a user account associated with that IP address may already be authenticated with the video service provider. The request message may be sent after calling an API associated with the video service provider 202 that requests the identity of the underlying video content associated with the data to enable rendering of the data by the display device 228 associated with video processing device 208. For example, the request message may contact the video service provider, provide account information of the user such as the IP address, and request that the video service identify the underlying video content associated with the data given that user account.

The wireless gateway 204 may be configured to receive, from the video service provider server 202 via network the 240, the requested information. The requested information may identify the underlying video content associated with the data. The requested information may further identify playback progress of the video content. The requested information may further identify multiple streams of video content, and the user may select which of the plurality of video streams to render on the display device 228 associated with the video processing device 208. The wireless gateway 204 may be configured to send, to the video processing device 208 in response to receiving the requested information, the data to be rendered by the display device 228.

In another example, the wireless gateway 204 may be configured to send a message to the video processing device 208 indicating that the wireless gateway 204 detected traffic on the WiFi network 260 that has the at least one characteristic. For example, the wireless gateway 204 may send a message indicating that traffic is being received from a particular video service provider. In this example, the video processing device 208 may be configured to render via the display device 228 a message comprising a selectable option to render the received data on the display device 228 (e.g., their television) instead of the user device 206 (e.g., their tablet). The selectable option rendered via the display device 228 may, for example, ask a user whether they would like to watch the video on that display device 228 (e.g., their television) rather than the user device 206 (e.g., their tablet).

The video processing device 208 may be configured to receive, from the user device 206, a response message indicating whether the option was selected, for example, from a remote control associated with the video processing device 208. If the option was selected, the video processing device 208 may send, to a video service provider server 202 via network 240, a request message that comprises a request for information associated with the received data. The request message may further include an IP address associated with a user of the video service provider 202, and a user account associated with that IP address may already be authenticated with the video service provider 202. The request message may be sent after calling an API associated with the video service provider 202 that requests the identity of the underlying video content associated with the data to enable rendering of the data by the display device 228 associated with the video processing device 208. For example, the request message may contact the video service provider 202, provide account information of the user such as the IP address, and request that the video service identify the underlying video content associated with the data given that user account. The video processing device 208 may be configured to receive, from the video service provider server 202 via the network 240, the requested information. The requested information may identify video content. The requested information may further identify playback progress of the video content. The video processing device 208 may be configured, in response to receiving the requested information, to render the received data via the display device 228.

In another example, the video processing device 208 may receive a user input that requests that the data be redirected to the video processing device 208. For example, the user may initiate the request via a microphone of a remote control associated with the video processing device 208 or via buttons on a remote control associated with the video processing device 208 enabling the user to then select an option for the feature of redirecting the data to the video processing device 208 via the graphical user interface (GUI) of the video processing device 208. After receiving the user request to redirect the data, the video processing device 208 may send, to a video service provider server 202 via the network 240, a request message that comprises a request for information associated with the received data as described above.

Figure 3:
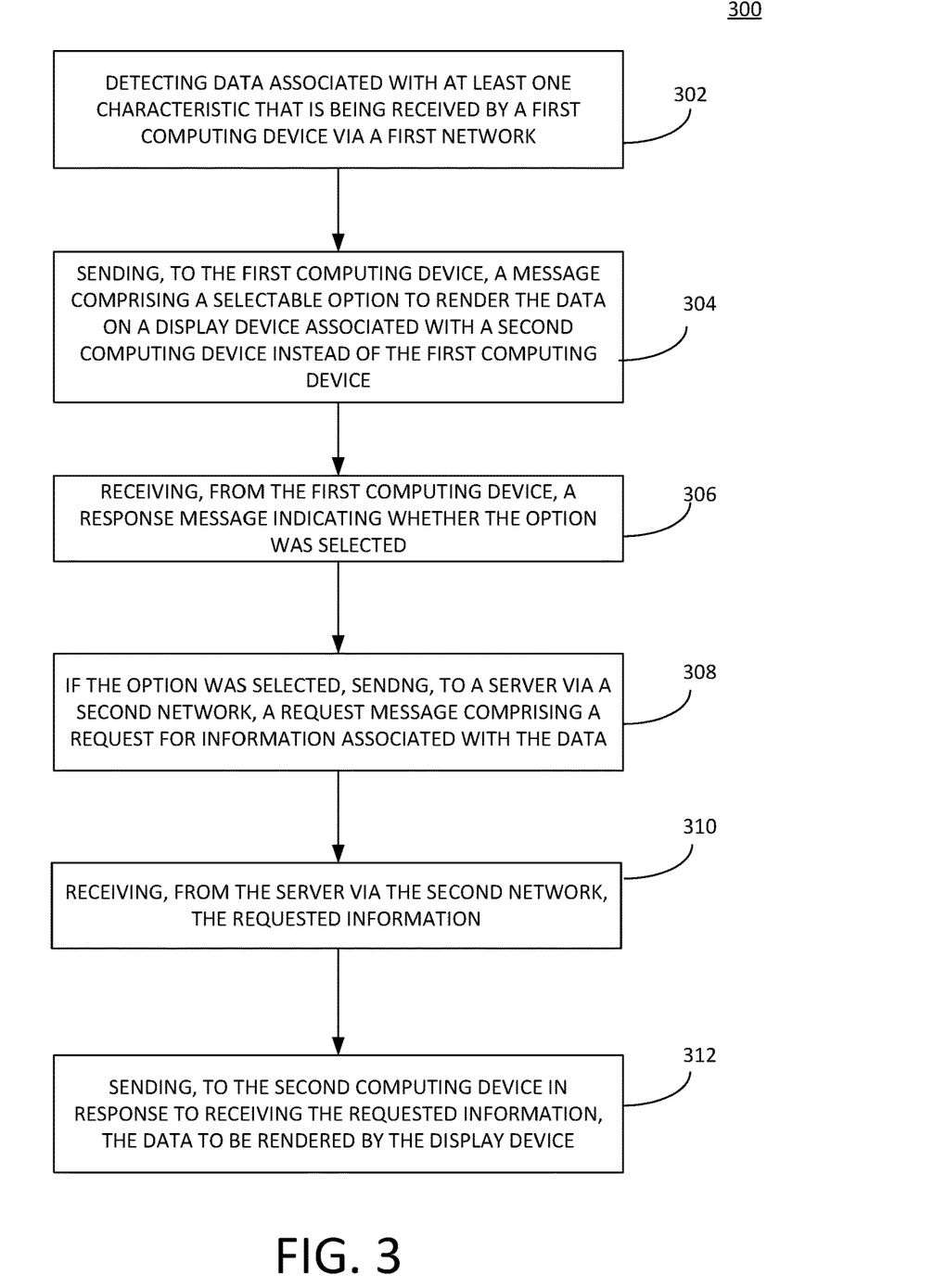
FIG. 3 is a flow diagram of an example method for redirecting data in accordance one example embodiment.

FIG. 3 is a flow diagram of an example method 300 for redirecting data in accordance one example embodiment. In the example of FIG. 3 a computing device, as described herein, such as a wireless gateway may implement the procedure 300. While each step of the procedure 300 in FIG. 3 is shown and described separately, multiple steps may be executed in a different order than what is shown, in parallel with each other, or concurrently with each other. The computing device may have a memory that has stored thereon computer-readable instructions that, when executed, cause the computing device to perform steps as described. In some examples, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may comprise one or more devices executing some or all of the operations of method 300 in response to instructions stored electronically on an electronic storage medium. The one or more processing devices may comprise one or more devices configured through hardware, firmware, and/or software to be specifically designed for execution of one or more of the operations of method 300.

Referring to FIG. 3, as shown in step 302, the wireless gateway (or any other computing device described herein) may detect data associated with at least one characteristic that is being received by a first computing device via a first network. The first computing device may comprise a smartphone or tablet. The data may be associated with video, audio, or a plurality of digital photograph files. The at least one characteristic may comprise high bandwidth consumption or a URL identifying a video service provider. The first network may comprise a WiFi network.

As shown in step 304, the wireless gateway may send, to the first computing device, a message comprising a selectable option to render the received data on a display device associated with a second computing device instead of the first computing device. The second computing device may comprise a set-top box, and the display device may comprise a television. The second computing device may be associated with a sound system.

As shown in step 306, the wireless gateway may receive, from the first computing device, a response message indicating whether the option was selected. As shown in step 308, if the option was selected, the wireless gateway may send, to a server via a second network, a request message that comprises a request for information associated with the received data. The server may be associated with a video service provider. The request message may further comprise an IP address associated with a user of a video service provider associated with the server. The second network may comprise the Internet and/or other networks.

As shown in step 310, the wireless gateway may receive, from the server via the second network, the requested information. The requested information may identify the video content or audio content. The requested information may further identify the playback progress of the video content or audio content. As shown in step 312, the wireless gateway may send, to the second computing device in response to receiving the requested information, the received data to be rendered by the display device.

Figure 4:
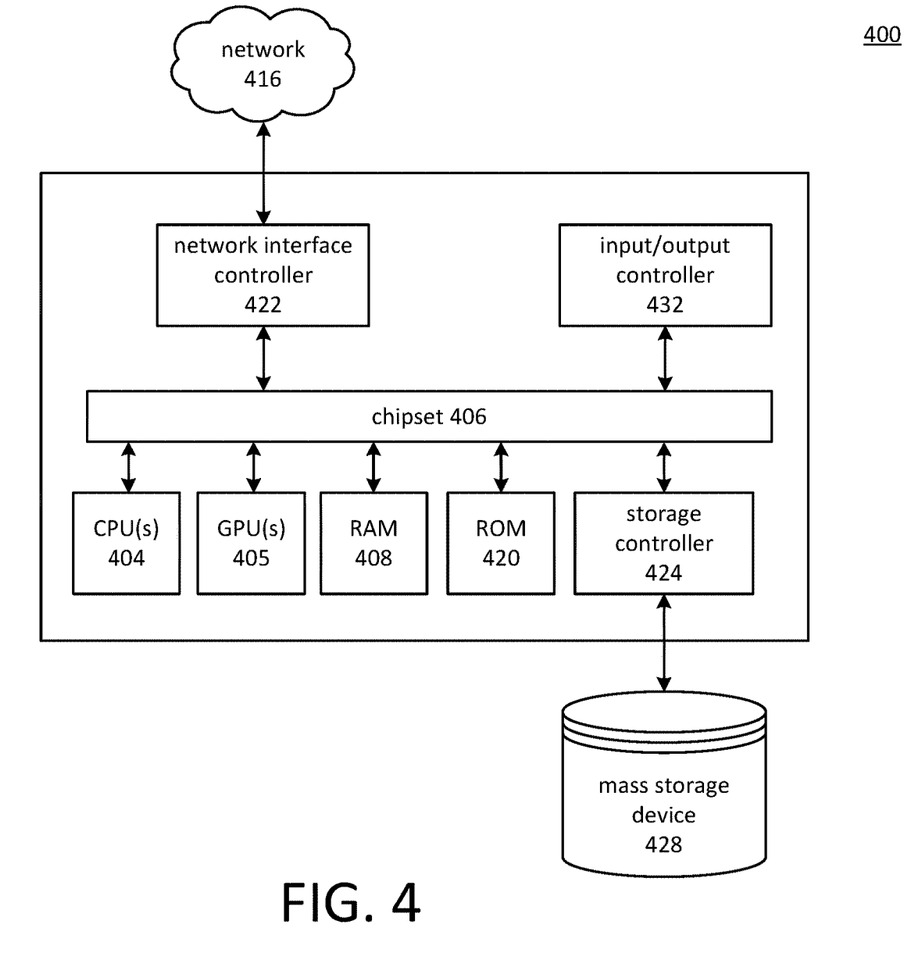
FIG. 4 depicts an example computing device that may be used in various aspects, such as the servers, modules, and/or devices described herein.

FIG. 4 depicts a computing device 400 that may be used in various aspects, such as the servers, modules, and/or devices depicted in FIGS. 1 and 2. With regard to the example architectures of FIGS. 1 and 2, the devices may each be implemented in an instance of a computing device 400 of FIG. 4. The computer architecture shown in FIG. 4 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 3.

The computing device 400 may include a baseboard, or "motherboard," which is a printed circuit board to which a multitude of components or devices may be connected by way of a system bus or other electrical communication paths. One or more central processing units (CPUs) 404 may operate in conjunction with a chipset 406. The CPU(s) 404 may be standard programmable processors that perform arithmetic and logical operations necessary for the operation of the computing device 400.

The CPU(s) 404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 404 may be augmented with or replaced by other processing units, such as GPU(s) 405. The GPU(s) 405 may comprise processing units specialized for but not necessarily limited to highly parallel computations, such as graphics and other visualization-related processing.

A chipset 406 may provide an interface between the CPU(s) 404 and the remainder of the components and devices on the baseboard. The chipset 406 may provide an interface to a random access memory (RAM) 408 used as the main memory in the computing device 400. The chipset 406 may further provide an interface to a computer-readable storage medium, such as a read-only memory (ROM) 420 or non-volatile RAM (NVRAM) (not shown), for storing basic routines that may help to start up the computing device 400 and to transfer information between the various components and devices. ROM 420 or NVRAM may also store other software components necessary for the operation of the computing device 400 in accordance with the aspects described herein.

The computing device 400 may operate in a networked environment using logical connections to remote computing nodes and computer systems through local area network (LAN) 416. The chipset 406 may include functionality for providing network connectivity through a network interface controller (NIC) 422, such as a gigabit Ethernet adapter. A NIC 422 may be capable of connecting the computing device 400 to other computing nodes over a network 416. It should be appreciated that multiple NICs 422 may be present in the computing device 400, connecting the computing device to other types of networks and remote computer systems.

The computing device 400 may be connected to a mass storage device 428 that provides non-volatile storage for the computer. The mass storage device 428 may store system programs, application programs, other program modules, and data, which have been described in greater detail herein. The mass storage device 428 may be connected to the computing device 400 through a storage controller 424 connected to the chipset 406. The mass storage device 428 may consist of one or more physical storage units. A storage controller 424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 400 may store data on a mass storage device 428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 428 is characterized as primary or secondary storage and the like.

For example, the computing device 400 may store information to the mass storage device 428 by issuing instructions through a storage controller 424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 may further read information from the mass storage device 428 by detecting the physical states or characteristics of one or more particular locations within the physical storage units.

In addition to the mass storage device 428 described herein, the computing device 400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 428 depicted in FIG. 4, may store an operating system utilized to control the operation of the computing device 400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 428 may store other system or application programs and data utilized by the computing device 400.

The mass storage device 428 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 400 by specifying how the CPU(s) 404 transition between states, as described herein. The computing device 400 may have access to computer-readable storage media storing computer-executable instructions, which, when executed by the computing device 400, may perform the methods described in relation to FIG. 3.

A computing device, such as the computing device 400 depicted in FIG. 4, may also include an input/output controller 432 for receiving and processing input from a number of input devices, such as a keyboard, a mouse, a touchpad, a touch screen, an electronic stylus, or other type of input device. Similarly, an input/output controller 432 may provide output to a display, such as a computer monitor, a flat-panel display, a digital projector, a printer, a plotter, or other type of output device. It will be appreciated that the computing device 400 may not include all of the components shown in FIG. 4, may include other components that are not explicitly shown in FIG. 4, or may utilize an architecture completely different than that shown in FIG. 4.

As described herein, a computing device may be a physical computing device, such as the computing device 400 of FIG. 4. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   detecting at least one characteristic associated with content that is being received by a first computing device via a first network;
   sending, to the first computing device and based on the at least one characteristic, a message comprising a selectable option to output the content on a display device associated with a second computing device instead of the first computing device;
   receiving, from the first computing device, a response message indicating that the selectable option is selected;
   sending, based on determining that the selectable option to output the content on the display device associated with the second computing device is selected, to a server via a second network, a request message comprising a request for information associated with the content being received at the first computing device;
   receiving, from the server via the second network, the requested information, the requested information indicating a playback progress of the content; and
   sending, to the second computing device in response to receiving the requested information, the content to be output by the display device based on the playback progress of the content.

2. The method of claim 1, wherein the request message further comprises an Internet Protocol (IP) address associated with the second computing device.

3. The method of claim 2, wherein the IP address is associated with an account authenticated with a service provider.

4. The method of claim 1, wherein the first computing device comprises a smartphone or tablet.

5. The method of claim 1, wherein the second computing device comprises a set-top box and the display device comprises a television.

6. The method of claim 1, wherein the server is associated with a service provider.

7. The method of claim 1, wherein the content comprises at least one of: video content, streamed content, audio content, or a plurality of digital photograph files.

8. The method of claim 1, wherein the requested information further identifies the content.

9. The method of claim 1, wherein the second computing device is associated with a sound system.

10. The method of claim 1, further comprising:
    calling an application programming interface (API) associated with a service provider that requests an identity of the content to enable an output by the display device.

11. The method of claim 1, wherein the at least one characteristic indicates one or more of a source of the content or a level of bandwidth consumption associated with the content, wherein the at least one characteristic further indicates the source of the content based on at least one of: identifying information of a service provider of the content or an indication that the content comprises video.

12. The method of claim 11, wherein the identifying information comprises a uniform resource locator (URL) identifying the service provider.

13. A device comprising:
    one or more processors; and
    memory storing instructions that, when executed by the one or more processors, cause the device to:
    detect at least one characteristic associated with content that is being received by a first computing device via a first network;
    send, to the first computing device and based on the at least one characteristic, a message comprising a selectable option to output the content on a display device associated with a second computing device instead of the first computing device;
    receive, from the first computing device, a response message indicating that the selectable option is selected;
    send, based on determining that the selectable option to output the content on the display device associated with the second computing device is selected, to a server via a second network, a request message comprising a request for information associated with the content being received at the first computing device;
    receive, from the server via the second network, the requested information, the requested information indicating a playback progress of the content; and
    send, to the second computing device in response to receiving the requested information, the content to be output by the display device based on the playback progress of the content.

14. The device of claim 13, wherein the request message further comprises an Internet Protocol (IP) address associated with the second computing device.

15. The device of claim 13, wherein the requested information identifies the content.

16. The device of claim 13, wherein the at least one characteristic indicates one or more of a source of the content or a level of bandwidth consumption associated with the content, wherein the at least one characteristic further the source of the content based on at least one of: identifying information of a service provider of the content or an indication that the content comprises video.

17. A system comprising:
    a gateway device configured to:
    detect at least one characteristic associated with content that is being received by a first computing device via a first network;
    send, to the first computing device and based on the at least one characteristic, a message comprising a selectable option to output the content on a display device associated with a second computing device instead of the first computing device;

receive, from the first computing device, a response message indicating that the selectable option is selected;

send, based on determining that the selectable option to output the content on the display device associated with the second computing device is selected, to a server via a second network, a request message comprising a request for information associated with the content being received at the first computing device;

receive, from the server via the second network, the requested information, the requested information indicating a playback progress of the content; and send, to the second computing device in response to receiving the requested information, the content to be output by the display device based on the playback progress of the content; and the second computing device configured to:
receive the content to cause the content to be output by the display device.

18. The system of claim 17, wherein the requested information identifies the content.

19. The system of claim 17, wherein the request message further comprises an Internet Protocol (IP) address associated with the second computing device.

20. The system of claim 17, wherein the at least one characteristic indicates one or more of a source of the content or a level of bandwidth consumption associated with the content, wherein the at least one characteristic further indicates the source of the content based on at least one of: identifying information of a service provider of the content or an indication that the content comprises video.

* * * * *